(12) United States Patent
Bleeker

(10) Patent No.: US 9,874,254 B2
(45) Date of Patent: Jan. 23, 2018

(54) ELECTROMAGNETIC BRAKE FOR A POWER TRANSMISSION ASSEMBLY

(71) Applicant: Warner Electric Technology LLC, Braintree, MA (US)

(72) Inventor: Todd Arlan Bleeker, Beloit, WI (US)

(73) Assignee: Warner Electric Technology LLC, Braintree, MA (US)

( * ) Notice: Subject to any disclaimer, the term of this patent is extended or adjusted under 35 U.S.C. 154(b) by 48 days.

(21) Appl. No.: 15/010,060

(22) Filed: Jan. 29, 2016

(65) Prior Publication Data

US 2017/0219030 A1    Aug. 3, 2017

(51) Int. Cl.
  *F16D 63/00* (2006.01)
  *F16D 65/14* (2006.01)
  *F16D 27/00* (2006.01)
  *F16D 121/20* (2012.01)

(52) U.S. Cl.
  CPC ........... *F16D 63/002* (2013.01); *F16D 65/14* (2013.01); *F16D 2027/008* (2013.01); *F16D 2121/20* (2013.01)

(58) Field of Classification Search
  CPC .................................................. F16D 63/002
  See application file for complete search history.

(56) References Cited

U.S. PATENT DOCUMENTS

| 3,148,751 | A |   | 9/1964 | White |
| 3,338,349 | A |   | 8/1967 | Klinkenberg et al. |
| 3,730,317 | A |   | 5/1973 | Jaeschke |
| 4,150,738 | A | * | 4/1979 | Sayo ...................... F16D 27/112 192/110 R |
| 4,285,421 | A |   | 8/1981 | Halsted |
| 4,387,794 | A | * | 6/1983 | Schneider .............. D03D 51/02 192/12 D |
| 4,432,446 | A | * | 2/1984 | Okano .................. F16D 27/112 192/84.941 |

(Continued)

FOREIGN PATENT DOCUMENTS

JP        02-107837 A     4/1990
WO     2014/112327 A1    7/2014

OTHER PUBLICATIONS

English language abstract for JP 02-107837.

(Continued)

*Primary Examiner* — David J Hlavka
(74) *Attorney, Agent, or Firm* — Reising Ethington P.C.

(57) ABSTRACT

An electromagnetic brake includes a hub disposed about a shaft and configured for rotation with the shaft about a rotational axis. An electromagnet assembly is fixed against rotation about the axis and includes a housing defining axially extending, radially spaced inner and outer poles and a brake plate extending radially therebetween. A conductor is disposed between the poles on one side of the brake plate. An armature is disposed on the other side of the brake plate and coupled to a body driven by the shaft. The electromagnet assembly, armature and hub form an electromagnetic circuit when the conductor is energized urging the armature towards the brake plate. A portion of the magnetic flux in the circuit travels radially inwardly across a first radial air gap from the inner pole to the hub and then radially outwardly across a second radial air gap from the hub to the brake plate.

20 Claims, 3 Drawing Sheets

(56) References Cited

U.S. PATENT DOCUMENTS

| | | | |
|---|---|---|---|
| 4,567,975 A | 2/1986 | Roll | |
| 5,119,918 A | 6/1992 | Pardee | |
| 5,242,040 A | 9/1993 | Koitabashi | |
| 5,497,869 A | 3/1996 | Muirhead et al. | |
| 6,827,189 B2 * | 12/2004 | Schneider | F16D 27/112 192/18 B |
| 7,975,818 B2 * | 7/2011 | Pardee | F16D 27/004 192/18 B |
| 8,235,196 B2 * | 8/2012 | Kato | F16D 27/105 192/82 T |
| 9,145,935 B2 | 9/2015 | Swales et al. | |
| 2006/0201770 A1 | 9/2006 | Yamaguchi et al. | |
| 2013/0015033 A1 | 1/2013 | Pardee et al. | |
| 2014/0128220 A1 | 5/2014 | Swales et al. | |

OTHER PUBLICATIONS

International Search Report issued in corresponding international patent application PCT/US2017/012441 (dated May 4, 2017).
Written opinion issued in corresponding international patent application PCT/US2017/012441 (dated May 4, 2017).

* cited by examiner

ELECTROMAGNETIC BRAKE FOR A POWER TRANSMISSION ASSEMBLY

BACKGROUND OF THE INVENTION a. Field of the Invention

This disclosure relates to an electromagnetic brake for a power transmission assembly. In particular, the disclosure relates to an electromagnetic brake having a hub that is configured to form a part of an electromagnetic circuit in the brake to reduce magnetic reluctance in the electromagnetic circuit and increase the magnetic attraction between an armature and a brake plate within the brake.

b. Background Art

Brakes are used to inhibit movement and are often used in power transmission assemblies to control and/or halt movement of a rotational body. In one conventional electromagnetic brake, a fixed electromagnet assembly includes a housing and a conductor disposed within the housing. A portion of the housing forms a brake plate. When current is supplied to the conductor an electromagnetic circuit is created between the housing of the electromagnet assembly and an armature that is coupled to a rotating body in order to draw the armature into engagement with the brake plate and inhibit rotation of the rotating body. The magnetic attraction between the brake plate and armature may be limited by a relatively high magnetic reluctance in the electromagnetic circuit. As a result, the brake torque that can be provided by the brake may also be limited.

The inventor herein has recognized a need for an electromagnetic brake that will minimize and/or eliminate one or more of the above-identified deficiencies.

BRIEF SUMMARY OF THE INVENTION

This disclosure relates to an electromagnetic brake for a power transmission assembly. In particular, the disclosure relates to an electromagnetic brake having a hub that is configured to form a part of an electromagnetic circuit in the brake to reduce magnetic reluctance in the electromagnetic circuit and increase the magnetic attraction between an armature and a brake plate within the brake.

An electromagnetic brake in accordance with one embodiment of the present teachings includes a hub configured to be disposed about a shaft and configured for rotation with the shaft about a rotational axis. The brake further includes an electromagnet assembly fixed against rotation about the rotational axis. The assembly includes a housing defining axially extending, radially spaced inner and outer poles and a brake plate extending radially between the inner and outer poles. The assembly further includes a conductor disposed within the housing between the inner and outer poles on a first side of the brake plate. The brake further includes an armature configured for coupling to a body that is rotatably driven by the shaft. The armature is disposed on a second side of the brake plate opposite the conductor. The electromagnet assembly, the armature and the hub form an electromagnetic circuit when current is supplied to the conductor to urge the armature towards engagement with the brake plate. A portion of the magnetic flux in the electromagnetic circuit travels radially inwardly across a first radial air gap from the inner pole of the housing of the electromagnet assembly to the hub and then radially outwardly across a second radial air gap from the hub to the brake plate of the housing of the electromagnet assembly.

A power transmission assembly in accordance with one embodiment of the present teachings includes a shaft configured for rotation about a rotational axis and a body that is rotatably driven by the shaft about the rotational axis. The power transmission assembly further includes an electromagnetic brake. The brake includes a hub configured to be disposed about the shaft and configured for rotation with the shaft about the rotational axis. The brake further includes an electromagnet assembly fixed against rotation about the rotational axis. The electromagnet assembly includes a housing defining axially extending, radially spaced inner and outer poles and a brake plate extending radially between the inner and outer poles. The electromagnet assembly further includes a conductor disposed within the housing between the inner and outer poles on a first side of the brake plate. The electromagnetic brake further includes an armature coupled to the body. The armature is disposed on a second side of the brake plate opposite the conductor. The electromagnet assembly, the armature and the hub form an electromagnetic circuit when current is supplied to the conductor to urge the armature towards engagement with the brake plate. A portion of the magnetic flux in the electromagnetic circuit travels radially inwardly across a first radial air gap from the inner pole of the housing of the electromagnet assembly to the hub and then radially outwardly across a second radial air gap from the hub to the brake plate of the housing of the electromagnet assembly.

An electromagnetic brake for a power transmission assembly in accordance with the present teachings is advantageous relative to conventional electromagnetic brakes. In particular, the hub of the brake is configured in a such a way that it forms a part of the electromagnetic circuit of the brake. The configuration reduces magnetic reluctance in the electromagnetic circuit and increase the magnetic attraction between an armature and a brake plate within the brake thereby increasing the available braking torque.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
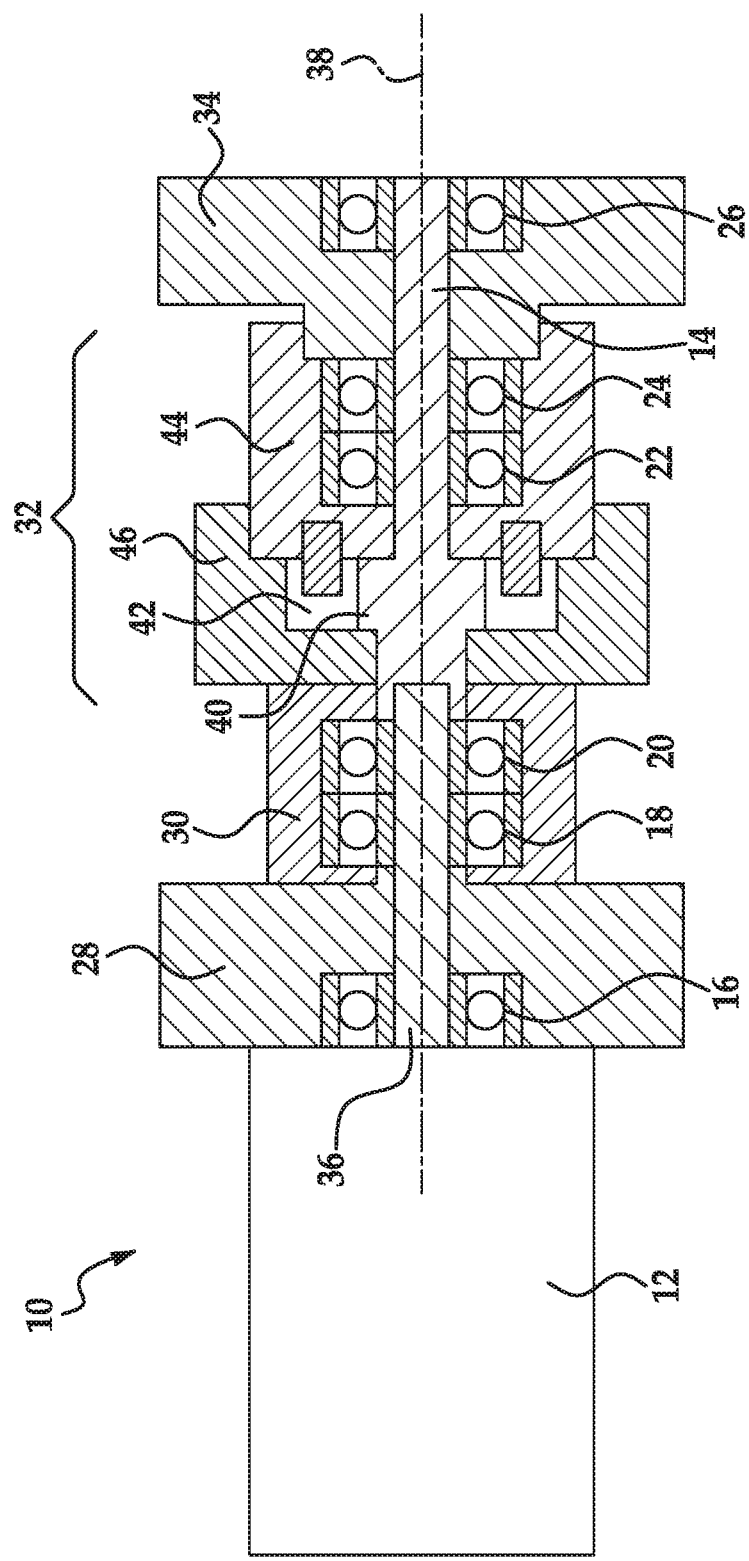
FIG. 1 is a schematic drawing of a power transmission assembly in accordance with one embodiment of the present teachings.

Referring now to the drawings wherein like reference numerals are used to identify identical components in the various views, FIG. 1 illustrates a power transmission assembly 10 in accordance with one embodiment of the present teachings. Assembly 10 may be provided for use in driving a propeller of a watercraft. It should be understood, however, that assembly 10 may be used to transmit power in a wide variety of applications. Assembly 10 may include an engine 12, a countershaft 14, bearings 16, 18, 20, 22, 24, 26 a clutch 28, a pulley 30, a planetary gear system 32 and an electromagnetic brake 34 in accordance with one embodiment of the present teachings.

Engine 12 generates power for use in various applications. Engine 12 may comprise any of various types of conventional internal combustion engines including both two and four stroke engines, engines having varying numbers of cylinders, and engines using various types of fluid and ignition mechanisms. Although an engine 12 is used to generate power in the illustrated embodiment, it should be understood that other power generators could be used including, for example, electric motors. An engine shaft 36 extends outward from engine 12 and is configured for rotation about a rotational axis 38.

Countershaft 14 is provided as an extension of engine shaft 36. Countershaft 14 may define a recess in one axial end face configured to receive one axial end of engine shaft 36. A fastener (not shown) may extend through a bore in countershaft 14 and into an aligned bore in engine shaft 36 in order to couple countershaft 14 to engine shaft 36 for rotation therewith about axis 38.

Bearings 16, 18, 20, 22, 24, 26 are provided to allow relative rotation of components within assembly 10. In the illustrated embodiment, bearing 16 is disposed between engine shaft 36 and a portion of clutch 28, bearings 18, 20 are disposed between engine shaft 36 and pulley 30, bearings 22, 24 are disposed between countershaft 14 and a portion of planetary gear system 32 and bearings 26 are disposed between countershaft 14 and a portion of brake 34. Bearings 16, 18, 20, 22, 24, 26 may comprise rolling bearings employing, for example, ball bearings or cylindrical roller bearings. The inner races of bearings 16, 18, 20 are supported on engine shaft 36 and configured to rotate with shaft 36. The inner races of bearings 22, 24, 26 are supported on countershaft 14 and configured to rotate with countershaft 14.

Clutch 28 is used to control power transmission from engine 12 to pulley 30. Clutch 28 may comprise an electromagnetic clutch having a rotor configured to rotate with engine shaft 36, an electromagnet assembly disposed on one side of the rotor and an armature disposed on the opposite side of the rotor and coupled to pulley 30. Current provided to the electromagnet assembly draws the armature into engagement with the rotor to transfer torque from engine shaft 36 to pulley 30. In the absence of current, the armature is disengaged from the rotor and no torque is transmitted to pulley 30.

Pulley 30 is provided to transfer torque to another body (not shown) through, for example, a belt wound around pulley 30. Pulley 30 may be disposed about, and centered about, engine shaft 36 and axis 38 and may be supported on bearings 18, 20 disposed about engine shaft 36. When clutch 28 is engaged, pulley 30 rotates with engine shaft 36 to transfer torque to another body. Although a pulley 30 is used in the illustrated embodiment, it should be understood that pulley 30 may alternatively comprise a sprocket or gear.

Planetary gear system 32 is provided to control rotation (including the direction of rotation) in another body such as a propeller of a watercraft. System 18 may include a sun gear 40, one or more planet gears 42 and an associated carrier 44 and a ring gear 46.

Sun gear 40 is configured for rotation with countershaft 14 about axis 38. Sun gear 40 is disposed about countershaft 14 and may be formed with countershaft 14 such that sun gear 40 and countershaft 14 form a unitary (one-piece) structure. Alternatively, sun gear 40 may be coupled to countershaft 14 through, for example, a spline interface, key/keyway interface, or interference fit. Sun gear 40 defines a plurality of gear teeth on a radially outer surface.

Planet gears 42 are disposed radially between sun gear 40 and ring gear 46. Each planet gear 42 defines gear teeth on a radially outer surface configured to engage gear teeth in sun gear 40 and ring gear 46. Planet gears 42 are coupled to carrier 44 in a conventional manner and are configured for rotation with carrier 44 about axis 38. Planet gears 42 are also configured for rotation relative to carrier 44 about axes extending through planet gears 42 parallel to axis 38.

Carrier 44 is provided to support planet gears 42 for rotation about axis 38. Carrier 44 is disposed about countershaft 14 and supported on bearings 22, 24. As described in greater detail hereinbelow, carrier 44 may be coupled to a portion of brake 34 to control rotation of carrier 44.

Ring gear 46 is provided to transmit torque to another body (not shown) through, for example, a toothed belt wound around ring gear 46. Ring gear 46 is disposed radially outwardly of sun gear 40 and planet gears 42 and includes a plurality of gear teeth on a radially inner surface configured to engage corresponding teeth on planet gears 42. It should be understood that the radially outer surface of ring gear 46 could be formed in a variety of ways to enable torque transfer including through gear teeth configured to engage another gear or through plain or toothed surfaces configured to engage corresponding belts. As discussed in greater detail below, when brake 34 is disengaged, torque is transmitted from engine shaft 36 and countershaft 14 through sun gear 40 and planet gears 42 to ring gear 46 to cause rotation of ring gear 46 in a first rotational direction. When brake 34 is engaged, carrier 44 is held stationary and continued rotation of engine shaft 36 and countershaft 14 causes ring gear 46 to rotate in a second rotational direction opposite the first rotational direction.

Figure 2:
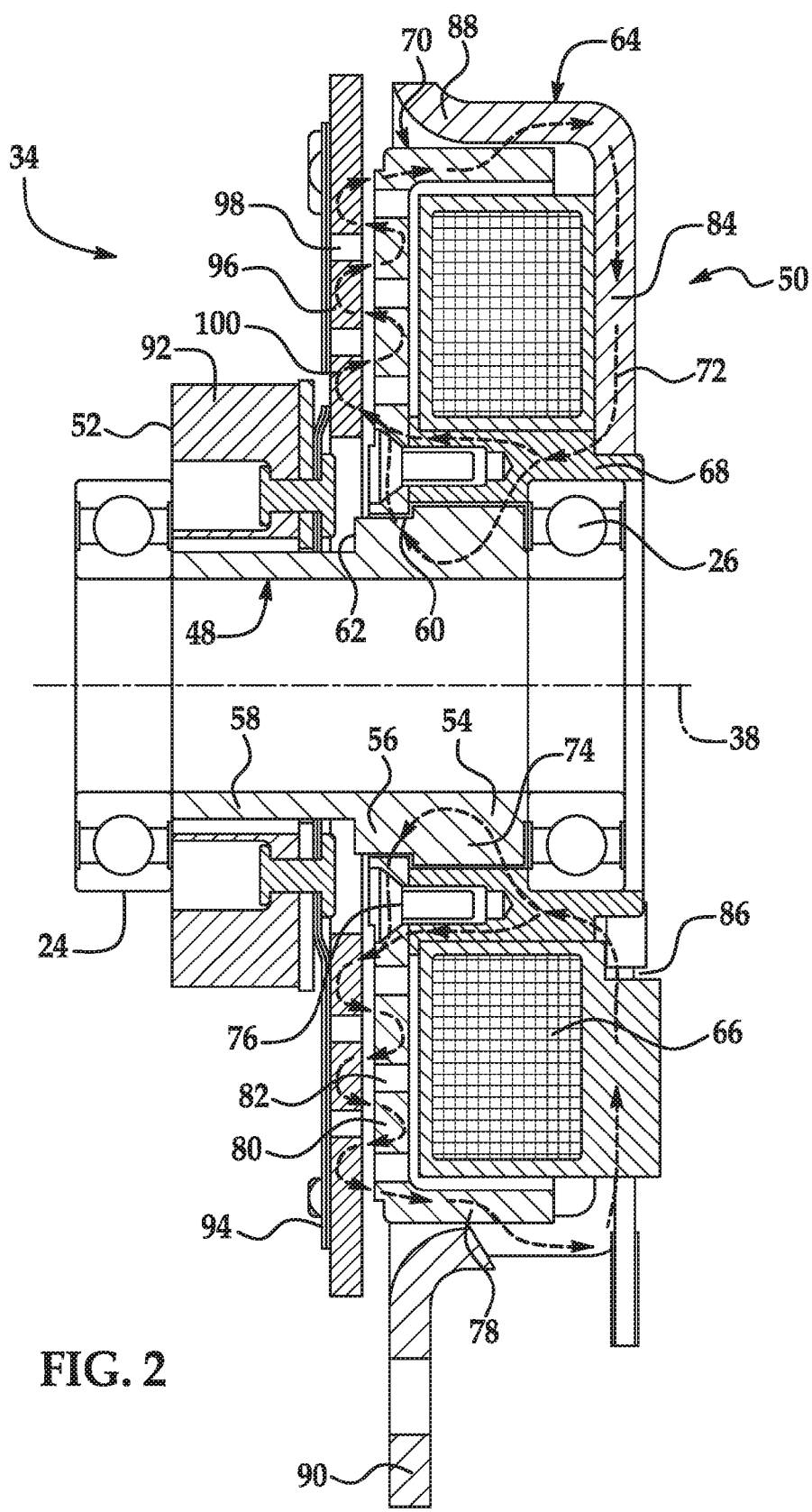
FIG. 2 is a cross-sectional drawing of an electromagnetic brake in accordance with one embodiment of the present teachings.

Electromagnetic brake 34 is provided to inhibit rotation of carrier 44 and planet gears 42 about axis 38 and thereby reverse the rotational direction of ring gear 46. Although brake 34 has been illustrated and described herein as incorporated within a specific type of power transmission assembly, it should be understood that brake 34 could be used in a wide variety of power transmission assemblies in which it is desired to selectively inhibit or halt rotation of another body disposed about the axis 38. For example, brake 34 could alternatively be employed to inhibit or halt rotation of a mower blade. Referring now to FIG. 2, brake 34 may include a hub 48, an electromagnet assembly 50 and an armature assembly 52.

Hub 48 is provided, in accordance with one aspect of the present teachings, to form part of an electromagnetic circuit with electromagnet assembly 50 and armature assembly 52 through which magnetic flux flows in order to engage brake 34. Hub 48 is configured to form a part of the circuit in order to increase the magnetic attraction between the electromagnet and armature assemblies 48, 50 within brake 34 thereby increasing the available braking torque. Hub 48 may be made from materials having a relatively low magnetic reluctance including low carbon steels. Hub 48 may be annular in construction and is configured to be disposed about countershaft 14 and configured for rotation with shaft 14 about axis 38. Hub 48 is disposed between bearings 24, 26 with one axial end of hub 48 configured to engage bearing 24 and an opposite axial end of hub 48 configured to engage bearing 26. In particular, hub 48 may be clamped between bearings 24, 26 such that the axial ends of hub 48 frictionally engage inner races of bearings 24, 26 and hub 48 rotates with the inner races of bearings 24, 26 and countershaft 14. Hub 48 may have a constant inner diameter sized to the diameter of countershaft 14. Hub 48 may have an outer diameter that varies along the axial length of hub 48.

Figure 3:
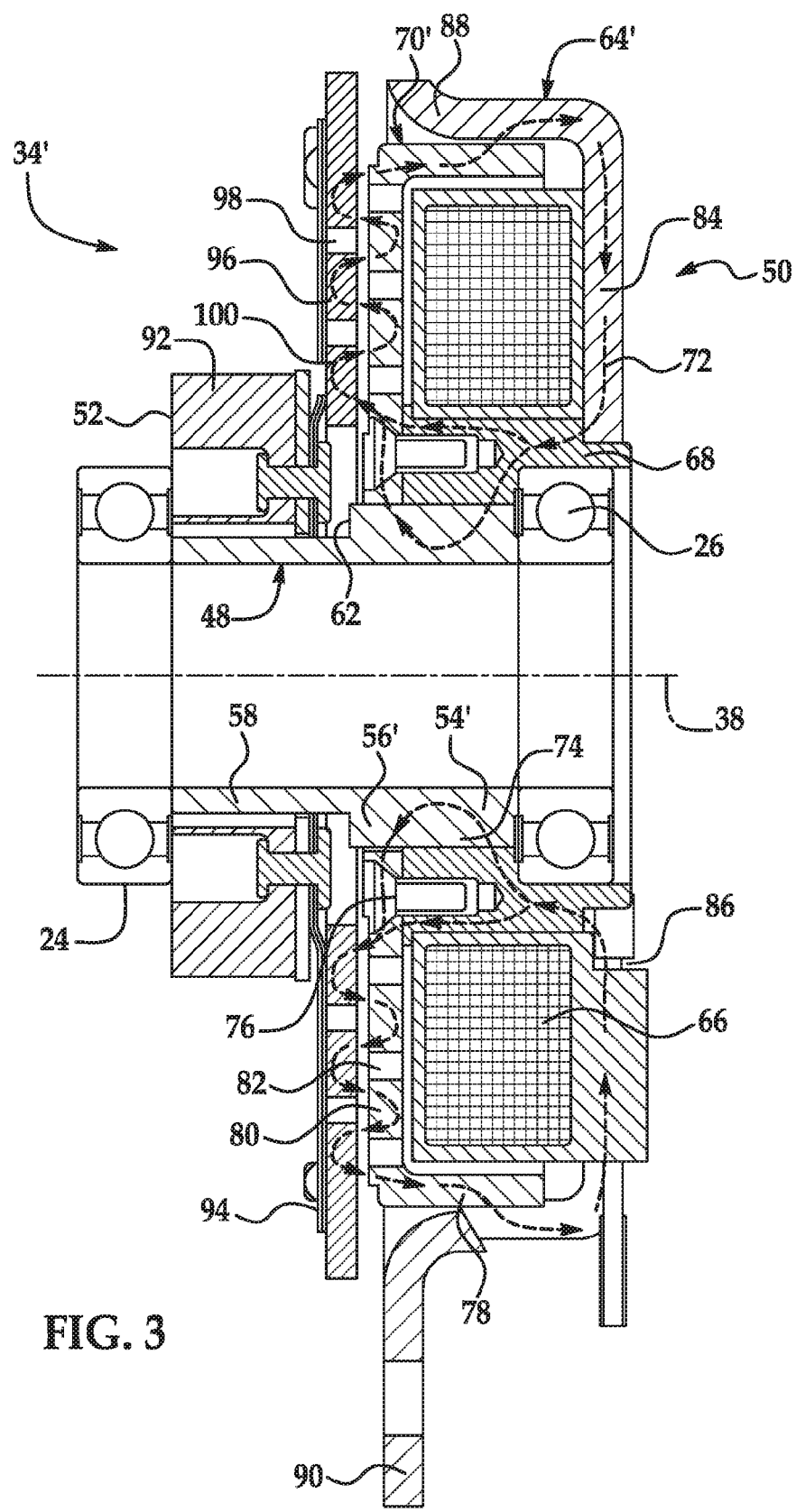
FIG. 3 is a cross-sectional drawing of an electromagnetic brake in accordance with another embodiment of the present teachings.

As shown in the illustrated embodiment, hub 48 may include several portions 54, 56, 58 having outer diameters that differ from one another. Portions 54, 56 may be disposed radially inwardly of different portions of electromagnet assembly 50. Portion 54 may have and outer diameter that is greater than an outer diameter of portion 56 such that portions 54, 56 define a shoulder 60 configured to receive a portion of electromagnet assembly 50. The outer diameter of portion 54 may be greater than an inner diameter of a portion of electromagnet assembly 50 that is disposed radially outward of portion 56. Portion 58 is disposed on an opposite side of portion 56 relative to portion 54 and may be disposed radially inwardly of armature assembly 52. Portion 58 may have an outer diameter that is less than the outer diameter of portions 54, 56 and may define a shoulder 62 with portion 56. Referring to FIG. 3, in an alternative embodiment, an electromagnetic brake 34' is provided that is substantially similar to brake 34, but includes a hub 48'. Hub 48' is substantially similar to hub 48, but unlike hub 48, portions 54', 56' of hub 48' have the same (equal) outer diameter to reduce manufacturing costs relative to hub 48 and brake 34 and facilitate easier assembly of brake 34'. As a result, the inner diameters of members 68, 70' of housing 64' may also have the same or substantially the same inner diameters.

Electromagnet assembly 50 is provided to create an electromagnetic circuit within brake 34 in order to draw armature assembly 52 into engagement with electromagnet assembly 50 to inhibit rotation of a rotating body to which armature assembly 52 is connected (such as planetary gear carrier 44 in the power transmission system of FIG. 1). Assembly 50 includes a housing 64 and a conductor 66.

Housing 64 provides structural support for conductor 66 and protects conductor 66 from external elements and objects. Housing 64 also forms a part of the electromagnetic circuit used to activate brake 34. Housing 64 may be made from materials having a relatively low magnetic reluctance including low carbon steels. Housing 64 may include multiple members 68, 70, 72.

Member 68 defines an axially extending inner pole 74 of the electromagnet assembly 50. A portion of member 68 is disposed radially outwardly of bearing 26 and supported on the outer race of bearing 26. Another portion of member 68 is disposed radially outwardly of portion 54 of hub 48 and defines one or more bores configured to receive fasteners 76 such as screws or bolts used to couple member 70 to member 68.

Member 70 is substantially C-shaped in cross-section and defines an axially extending outer pole 78 of the electromagnet assembly 50 that is radially spaced from inner pole 74. Member 70 further defines a brake plate 80 that extends radially between poles 74, 78. The brake plate 80 may define a plurality of radially and circumferentially spaced arcuate slots 82 to provide a path for the flow of magnetic flux between brake plate 80 and armature assembly 52. Brake plate 80 may also define one or more bores configured for alignment with corresponding bores in member 68 and configured to receive fasteners 76 used to couple member 70 to member 68. In the illustrated embodiment, the bores are tapered and configured to receive the heads of the fasteners 76. Brake plate 80 is disposed radially outwardly of portion 56 of hub 48. The inner diameter of brake plate 80 may be smaller than the inner diameter of the portion of member 68 disposed radially outward of portion 54 of hub 48 thereby defining a shoulder between members 68, 70 complementary to shoulder 60 in hub 48.

Member 72 is disposed radially outwardly of member 68 and supported on member 68. Member 72 may engage member 68 in an interference fit. Member 72 defines a radially extending end wall 84 disposed on an opposite of conductor 66 relative to brake plate 80. The end wall 84 may define one or more openings 86 through which conductor 66 extends in order to couple conductor 66 to a power source (not shown) and/or secure conductor 66 against rotation. Member 72 further defines an axially extending portion 88 that may be disposed radially outwardly of outer pole 78 and form a portion of a magnetic flux path. Member 72 further defines a radially extending flange portion 90 extending from one end of portion 88 and configured for coupling to a stationary structure through which electromagnet assembly 50 may be fixed against rotation relative to axis 38.

Conductor 66 is provided to create an electromagnetic circuit among hub 48, electromagnet assembly 50 and armature assembly 52. Conductor 66 is disposed within housing 64 radially between inner and outer poles 74, 78 and axially between brake plate 80 and end wall 84. Conductor 66 may comprise a conventional copper coil or similar conductive structure encapsulated in a material having a relatively low magnetic reluctance.

Armature assembly 52 is provided to transmit a braking torque to a rotating body such as planet gear carrier 44 in the power transmission system of FIG. 1. Assembly 52 may include an armature hub 92, one or more leaf springs 94, and an armature 96. In the illustrated embodiment, armature assembly 52 is coupled to carrier 44 and configured for rotation relative to countershaft 14 via bearings 22, 24 supporting carrier 14 on countershaft 14. In cases where brake 34 is used with other transmission assemblies, however, armature assembly 52 may itself include one or more bearings to permit rotation of assembly 52 relative to a shaft.

Hub 92 may be configured to engage a rotational body such as planet gear carrier 44 in order to transmit a braking torque from armature 96 to the rotational body. Hub 92 may be coupled to carrier 44 using fasteners such as bolts. As discussed above, brake 34 may be used in connection with a variety of power transmission assemblies. As a result, it should be understood that the shape and configuration of hub 92 may vary depending on the rotational body that hub 92 is coupled to and that the manner of coupling may likewise vary. Hub 92 may be disposed radially outwardly of portion 58 of hub 48. Hub 92 is further configured to anchor one end of each leaf spring 94.

Leaf springs 94 enable movement of armature 96 along axis 38 towards and away from brake plate 80. An inner end of each spring 94 may be fastened to hub 92 while an outer end of each spring 94 may be fastened to armature 96 using conventional fasteners such as rivets. Springs 94 bias armature 96 away from brake plate 80 and towards hub 92.

Armature 96 is provided for selective engagement with brake plate 80 in order to transmit a braking torque through armature assembly 52 to carrier 44 or another rotating body. Armature 96 is made from materials having a relatively low magnetic reluctance including low carbon steels. Armature 96 may be annular in construction and may define a plurality of radially and circumferentially spaced arcuate slots 98 configured to be located at radial distances from axis 38 that are offset relative to slots 82 in brake plate 80 in order to provide a path for the flow of magnetic flux back and forth between brake plate 80 and armature 96. Armature 96 is disposed on an opposite side of brake plate 80 relative to conductor 66.

Referring again to FIG. 2, the operation of brake 34 will be described. When current is provided to conductor 66, an electromagnetic circuit 100 is formed including hub 48, members 68, 70, 72 of housing 64 of electromagnet assembly 50 and armature 96 of armature assembly 52 in order to draw armature 96 into engagement with brake plate 80. As illustrated in FIG. 2, magnetic flux within circuit 100 travels a path back and forth between brake plate 80 and armature 96 until it reaches outer pole 78. The flux then crosses a radial air gap from outer pole 78 to portion 88 of member 72 of housing 64. The flux travels from portion 88 of member 72 through end wall 84 of member 72 to inner pole 74 of member 68. A portion of the magnetic flux travels directly from inner pole 74 to brake plate 80. In accordance with the present teachings, however, another portion of the magnetic flux travels radially inwardly from inner pole 74 to portion 54 of hub 48 across a radial air gap between pole 74 and portion 54 of hub 48 and then radially outwardly from portion 56 of hub 48 to brake plate 80 across a radial air gap between portion 56 of hub 48 and brake plate 80. This additional pathway acts to increase the magnetic attraction between the brake plate 80 and armature 96 thereby increasing the available braking torque. When the supply of current to conductor 66 ends, the electromagnetic circuit terminates and leaf springs 94 draw armature 96 away from brake plate 80.

An electromagnetic brake 34 for a power transmission 10 assembly in accordance with the present teachings is advantageous relative to conventional electromagnetic brakes. In particular, the hub 48 of the brake 34 is configured in a such a way that it forms a part of the electromagnetic circuit 100 of the brake 34. The configuration reduces magnetic reluctance in the electromagnetic circuit 100 and increase the magnetic attraction between an armature 96 and a brake plate 80 within the brake 34 thereby increasing the available braking torque. While the invention has been shown and described with reference to one or more particular embodiments thereof, it will be understood by those of skill in the art that various changes and modifications can be made without departing from the spirit and scope of the invention.

What is claimed is:

1. An electromagnetic brake, comprising:
    a hub configured to be disposed about a shaft and configured for rotation with the shaft about a rotational axis;
    an electromagnet assembly fixed against rotation about the rotational axis and including
        a housing defining axially extending, radially spaced inner and outer poles and a brake plate extending radially between the inner and outer poles; and
        a conductor disposed within the housing between the inner and outer poles on a first side of the brake plate; and,
    an armature configured for coupling to a body that is rotatably driven by the shaft, the armature disposed on a second side of the brake plate opposite the conductor;
    wherein the electromagnet assembly, the armature and the hub form an electromagnetic circuit when current is supplied to the conductor to urge the armature towards engagement with the brake plate, a portion of the magnetic flux in the electromagnetic circuit travelling radially inwardly across a first radial air gap from the inner pole of the housing of the electromagnet assembly to the hub and then radially outwardly across a second radial air gap from the hub to the brake plate of the housing of the electromagnet assembly.

2. The electromagnetic brake of claim 1 wherein the hub includes a first end configured to engage a first bearing disposed about the shaft and a second end configured to engage a second bearing disposed about the shaft.

3. The electromagnetic brake of claim 2 wherein the first and second bearings comprise rolling bearings and the first end of the hub is configured to engage an inner race of the first bearing and the second end of the hub is configured to engage an inner race of the second bearing, the inner races of the first and second bearings configured to rotate with the shaft.

4. The electromagnetic brake of claim 1 wherein the hub has a first portion disposed radially inwardly of the inner pole of the housing of the electromagnet assembly and a second portion disposed radially inwardly of the brake plate of the housing of the electromagnet assembly, an outer diameter of the first portion different than an outer diameter of the second portion.

5. The electromagnetic brake of claim 4 wherein the outer diameter of the second portion of the hub is less than the outer diameter of the first portion of the hub.

6. The electromagnetic brake of claim 4 wherein the outer diameter of the first portion of the hub is greater than an inner diameter of the brake plate of the housing of the electromagnet assembly.

7. The electromagnetic brake of claim 4 wherein the hub has a third portion disposed radially inwardly of the armature, an outer diameter of the third portion different than the outer diameter of the first portion and the outer diameter of the second portion.

8. The electromagnetic brake of claim 7 wherein the outer diameter of the third portion is less than the outer diameter of the first portion and the outer diameter of the second portion.

9. The electromagnetic brake of claim 1 wherein the hub has a first portion disposed radially inwardly of the inner pole of the housing of the electromagnet assembly and a second portion disposed radially inwardly of the brake plate of the housing of the electromagnet assembly, an outer diameter of the first portion equal to an outer diameter of the second portion.

10. The electromagnetic brake of claim 9 wherein the hub has a third portion disposed radially inwardly of the armature, an outer diameter of the third portion different than the outer diameter of the first portion and the outer diameter of the second portion.

11. A power transmission assembly, comprising:
    a shaft configured for rotation about a rotational axis;
    a body that is rotatably driven by the shaft about the rotational axis; and,
    an electromagnetic brake including
        a hub configured to be disposed about the shaft and configured for rotation with the shaft about the rotational axis;
        an electromagnet assembly fixed against rotation about the rotational axis and including
            a housing defining axially extending, radially spaced inner and outer poles and a brake plate extending radially between the inner and outer poles; and
            a conductor disposed within the housing between the inner and outer poles on a first side of the brake plate; and,
        an armature coupled to the body, the armature disposed on a second side of the brake plate opposite the conductor;
        wherein the electromagnet assembly, the armature and the hub form an electromagnetic circuit when current is supplied to the conductor to urge the armature towards engagement with the brake plate, a portion of the magnetic flux in the electromagnetic circuit travelling radially inwardly across a first radial air gap from the inner pole of the housing of the electromagnet assembly to the hub and then radially outwardly across a second radial air gap from the hub to the brake plate of the housing of the electromagnet assembly.

12. The power transmission assembly of claim 11 wherein the hub includes a first end configured to engage a first bearing disposed about the shaft and a second end configured to engage a second bearing disposed about the shaft.

13. The power transmission assembly of claim 12 wherein the first and second bearings comprise rolling bearings and the first end of the hub is configured to engage an inner race of the first bearing and the second end of the hub is configured to engage an inner race of the second bearing, the inner races of the first and second bearings configured to rotate with the shaft.

14. The power transmission assembly of claim 11 wherein the hub has a first portion disposed radially inwardly of the inner pole of the housing of the electromagnet assembly and a second portion disposed radially inwardly of the brake plate of the housing of the electromagnet assembly, an outer diameter of the first portion different than an outer diameter of the second portion.

15. The power transmission assembly of claim 14 wherein the outer diameter of the second portion of the hub is less than the outer diameter of the first portion of the hub.

16. The power transmission assembly of claim 14 wherein the outer diameter of the first portion of the hub is greater than an inner diameter of the brake plate of the housing of the electromagnet assembly.

17. The power transmission assembly of claim 14 wherein the hub has a third portion disposed radially inwardly of the armature, an outer diameter of the third portion different than the outer diameter of the first portion and the outer diameter of the second portion.

18. The power transmission assembly of claim 17 wherein the outer diameter of the third portion is less than the outer diameter of the first portion and the outer diameter of the second portion.

19. The power transmission assembly of claim 11 wherein the hub has a first portion disposed radially inwardly of the inner pole of the housing of the electromagnet assembly and a second portion disposed radially inwardly of the brake plate of the housing of the electromagnet assembly, an outer diameter of the first portion equal to an outer diameter of the second portion.

20. The power transmission assembly of claim 11 wherein the body comprises a carrier in a planetary gear system.

* * * * *